(12) United States Patent
Kervec et al.

(10) Patent No.: US 8,264,601 B2
(45) Date of Patent: Sep. 11, 2012

(54) VIDEO PICTURE FORMAT CONVERSION METHOD AND CORRESPONDING DEVICE

(75) Inventors: Jonathan Kervec, Paimpont (FR); Hassane Guermoud, Pont Pean (FR); Lyline Lim, Sevran (FR)

(73) Assignee: Thomson Licensing, Boulogne, Billancourt (FR)

( * ) Notice: Subject to any disclaimer, the term of this patent is extended or adjusted under 35 U.S.C. 154(b) by 549 days.

(21) Appl. No.: 12/315,996

(22) Filed: Dec. 9, 2008

(65) Prior Publication Data

US 2009/0167936 A1    Jul. 2, 2009

(30) Foreign Application Priority Data

Dec. 13, 2007  (FR) .................................... 0759829

(51) Int. Cl.
- *H04N 7/01* (2006.01)
- *H04N 11/20* (2006.01)
- *H04N 9/74* (2006.01)
- *H04N 5/21* (2006.01)
- *G06K 9/48* (2006.01)

(52) U.S. Cl. ........ 348/441; 348/445; 348/448; 348/458; 348/581; 348/625; 382/199

(58) Field of Classification Search .................. 348/441, 348/445, 446, 448, 458, 625, 581; 345/660; 382/199, 266, 298, 300

See application file for complete search history.

(56) References Cited

U.S. PATENT DOCUMENTS

| | | | | |
|---|---|---|---|---|
| 5,532,751 A * | 7/1996 | Lui | ............................. | 348/452 |
| 6,122,017 A * | 9/2000 | Taubman | ..................... | 348/620 |
| 6,771,835 B2 * | 8/2004 | Han et al. | ..................... | 382/260 |
| 7,023,487 B1 * | 4/2006 | Adams | ......................... | 348/448 |
| 7,075,580 B2 * | 7/2006 | Jiang | ............................. | 348/448 |
| 7,116,372 B2 * | 10/2006 | Kondo et al. | ................ | 348/448 |
| 7,126,643 B2 * | 10/2006 | Song et al. | ..................... | 348/448 |
| 7,242,412 B2 * | 7/2007 | Sellers | .......................... | 345/606 |
| 7,259,794 B2 * | 8/2007 | Chang et al. | ................. | 348/452 |
| 7,319,797 B2 * | 1/2008 | Hung | ............................. | 382/260 |
| 7,321,400 B1 * | 1/2008 | Chou et al. | .................... | 348/616 |
| 7,379,625 B2 * | 5/2008 | Wang et al. | ................... | 382/300 |

(Continued)

FOREIGN PATENT DOCUMENTS

EP          1 313 312 A2    5/2003

(Continued)

OTHER PUBLICATIONS

International Search Report dated May 7, 2008.

*Primary Examiner* — Brian Yenke

(74) *Attorney, Agent, or Firm* — Jeffrey D. Carter (57) ABSTRACT

The present invention can be implemented in a video coder or decoder or directly in any type of display device. According to the invention, a distance representative of the edge orientation in the input picture is calculated, for at least one point situated inside a zone delimited by a first set of neighbouring pixels of the input picture, it is calculated independently from the grid of pixels of the output picture. For at least one pixel of the output picture situated in this zone, a second set of pixels is determined in the input picture from the distance and the position of said pixel of the output picture in this zone. The value of this output pixel is then determined from the value of the pixels of said second set of pixels. This method enables a reduction in the number of calculations for this format conversion.

8 Claims, 5 Drawing Sheets

U.S. PATENT DOCUMENTS

| | | | |
|---|---|---|---|
| 7,379,626 B2 * | 5/2008 | Lachine et al. | 382/300 |
| 7,382,929 B2 * | 6/2008 | Cooper | 382/267 |
| 7,397,973 B2 * | 7/2008 | Lee | 382/300 |
| 7,403,234 B2 * | 7/2008 | Lertrattanapanich et al. | 348/448 |
| 7,406,208 B2 * | 7/2008 | Chiang | 382/266 |
| 7,412,096 B2 * | 8/2008 | Neuman et al. | 382/199 |
| 7,414,671 B1 * | 8/2008 | Gallagher et al. | 348/625 |
| 7,440,016 B2 * | 10/2008 | Keshet et al. | 348/280 |
| 7,474,789 B2 * | 1/2009 | Wang et al. | 382/199 |
| 7,519,232 B2 * | 4/2009 | Neuman et al. | 382/266 |
| 7,548,275 B1 * | 6/2009 | Honda | 348/448 |
| 7,554,559 B2 * | 6/2009 | Lu et al. | 345/606 |
| 7,590,307 B2 * | 9/2009 | Wang et al. | 382/300 |
| 7,782,401 B1 * | 8/2010 | Chou | 348/581 |
| 7,876,979 B2 * | 1/2011 | Lee et al. | 382/300 |
| 7,945,120 B2 * | 5/2011 | Tanaka | 382/299 |
| 8,139,153 B2 * | 3/2012 | Kervec et al. | 348/448 |
| 2003/0206667 A1 | 11/2003 | Wang et al. | |
| 2004/0119884 A1 * | 6/2004 | Jiang | 348/448 |
| 2005/0073607 A1 * | 4/2005 | Ji et al. | 348/448 |
| 2005/0122426 A1 * | 6/2005 | Winger et al. | 348/452 |
| 2006/0268168 A1 * | 11/2006 | Au et al. | 348/448 |
| 2007/0052845 A1 * | 3/2007 | Adams | 348/452 |
| 2008/0024658 A1 * | 1/2008 | Wang et al. | 348/448 |
| 2008/0068498 A1 * | 3/2008 | Chang et al. | 348/448 |
| 2008/0231746 A1 * | 9/2008 | Lertrattanapanich et al. | 348/448 |
| 2009/0207304 A1 * | 8/2009 | Kervec | 348/448 |
| 2009/0214132 A1 * | 8/2009 | Yamada et al. | 382/266 |

FOREIGN PATENT DOCUMENTS

| | | |
|---|---|---|
| GB | 2 422 264 A | 7/2006 |

* cited by examiner

VIDEO PICTURE FORMAT CONVERSION METHOD AND CORRESPONDING DEVICE

This application claims the benefit, under 35 U.S.C. §119 of French Patent Application 0759829, filed Dec. 13, 2007.

FIELD OF THE INVENTION

The present invention relates to a method and a device for video picture format conversion. It can be implemented in a video coder or decoder or directly in any type of display device.

TECHNOLOGICAL BACKGROUND OF THE INVENTION

There are currently two formats associated with standard HDTV (High Definition TV). These two formats are the 720p format and the 1080i format. The 720p format produces progressive pictures comprising 720 lines and 1280 columns and the 1080i format produces interlaced pictures comprising 1080 lines and 1920 columns. Each of these formats has advantages that are specific to it. The 720p format presents a better temporal resolution and reproduces fast moving objects without creating a blur effect while the 1080i format presents a better spatial resolution. The programme broadcasters have chosen to use one or other of these formats but not both together. There is therefore a real necessity to process, prior to display, the format of broadcast programmes, to transform it into a format supported by the display device used to display said programmes.

It is known in the art to change the format of a video picture by first carrying out a detection of the local edge orientation in the input picture then carrying out an interpolation based on the detected orientations. A distance representative of the edge orientation is calculated at a point of the input picture having the same spatial position (i.e. the same spatial coordinates) as the pixel of the output picture to be interpolated and this distance is then used to calculate the value of this pixel of the output picture. This method is relatively complex and consuming in terms of calculation resources.

SUMMARY OF THE INVENTION

The purpose of the present invention is to improve this method.

The present invention relates to a format conversion method of an input picture to an output picture, comprising the following steps:
  calculate, in at least one point situated inside a zone delimited by a first set of neighbouring pixels of the input picture, a distance representative of the edge orientation at this point,
  determine, for at least one pixel situated in a zone of the output picture corresponding to the zone delimited by the first set of neighbouring pixels of said input picture, a second set of pixels in the input picture from the calculated distance for said point in the zone and from the position of said pixel of the output picture in the zone of the output picture,
  determine the value of said pixel of the output picture from the value of the pixels of the second set of pixels.

According to a particular embodiment, the neighbouring pixels of the first set belong to at least two consecutive lines or columns of pixels of the input picture.

The calculation of the distance representative of the edge orientation is carried out on a single point of the zone of the input picture to reduce the number of calculations. This point is thus advantageously situated at the centre of said zone.

According to the invention, the distance representative of the edge orientation at a point of the input picture depends on a local gradient of video components of the input picture at said point.

According to a particular embodiment, if the calculated distance exceeds a predefined maximum value, the distance is capped at said maximum value.

According to another particular embodiment, if the calculated distance exceeds a predefined maximum value, the distance is adjusted to a null value.

According to the invention, the value of the pixel of the output picture is advantageously determined by bilinear interpolation of pixels of the second set.

The invention also relates to a device for format conversion of an input picture into an output picture, the input picture and the output picture comprising the pixels, comprising:
  a calculation circuit to calculate, in at least one point situated inside a zone delimited by a first set of neighbouring pixels of the input picture, a distance representative of the edge orientation at this point, and
  an interpolation circuit to determine, for at least one pixel situated in a zone of the output picture corresponding to the zone delimited by the first set of neighbouring pixels of said input picture, a second set of pixels in the input picture from the distance or distances calculated for the point or points of the zone and from the position of the pixel of the output picture in the zone of the output picture, and to determine the value of the pixel of said output picture from the value of the pixels of the second set of pixels of the input picture.

BRIEF DESCRIPTION OF THE DRAWINGS

The invention will be better understood upon reading the following description, provided as a non-restrictive example and referring to the annexed drawings wherein.

DETAILED DESCRIPTION OF THE PREFERRED EMBODIMENTS OF THE INVENTION

The method of the invention is used to carry out a format conversion of an input picture. The method produces an output picture having a format different to that of the input picture, the output picture comprising a larger or smaller number of lines and/or columns than the input picture. The lines and/or columns of the output picture are generated by interpolation of the lines and/or columns of the input picture.

According to the invention, the interpolation is an "edge orientated interpolation". This interpolation is more particularly realised when based on a detection of local edge orientations in the input picture. This detection is carried out by calculating the distances representative of the orientation of these edges. An example of the calculation of this distance will be described later in the description.

Figure 1:
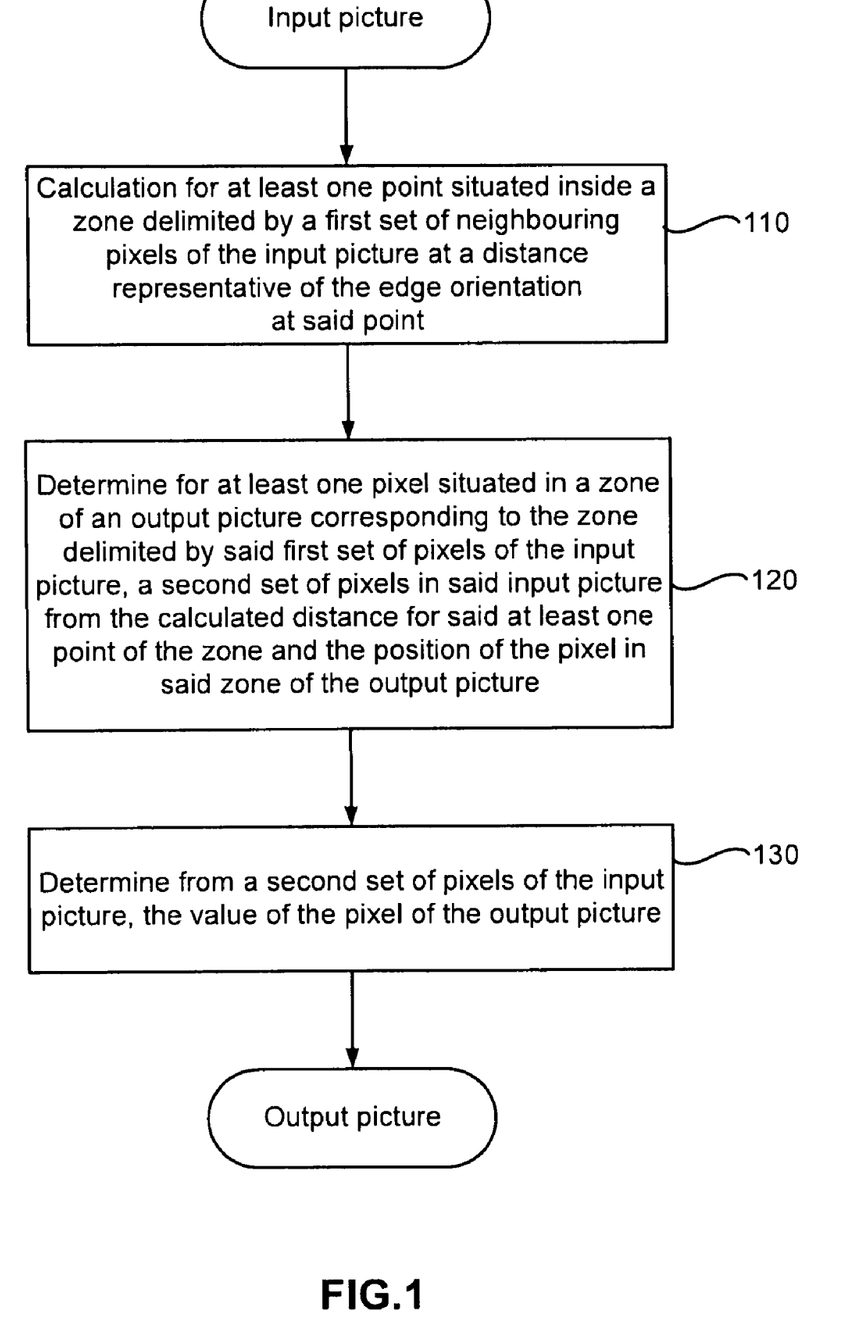
FIG. 1 shows the steps in a first embodiment of the method according to the invention

FIG. 1 shows the steps in a first embodiment of the method according to the invention. The method is applied to all or part of an input picture to generate an output picture of a different format. In reference to FIG. 1, the method comprises a first step 110 of calculation of a distance representative of an edge orientation and at least one point situated inside a zone delimited by a first set of neighbouring pixels of the input picture. This zone is for example delimited by 4 adjacent pixels belonging to two consecutive lines and two consecutive columns of the input picture. According to the invention, the distance calculated for a point in this zone of the input picture is used to calculate the value of the pixels of the output picture present in this zone of the picture.

Figure 2:
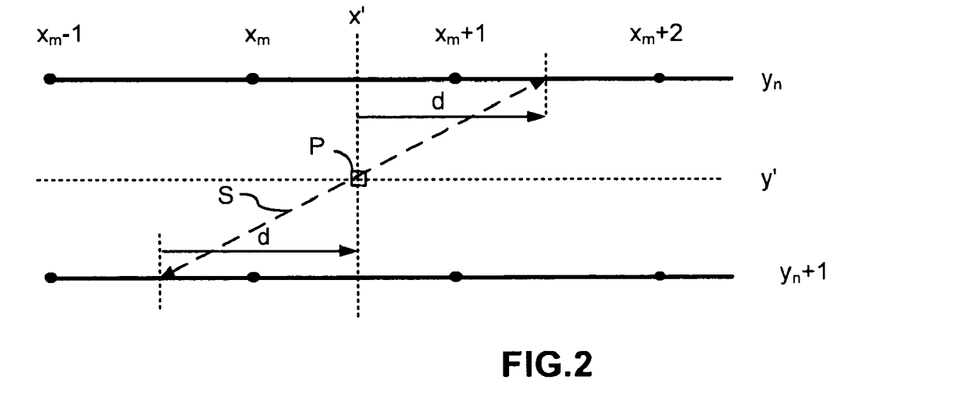
FIG. 2 shows the position of a point P of the input picture in which it is calculated at a distance representative of the edge orientation.

An example of the calculation of the representative distance d of the edge orientation at a point of the input picture is described hereafter. This distance d, is calculated at a point P of the input picture as shown in FIG. 2. FIG. 2 shows 8 pixels of the input picture spread over two consecutive lines $y_n$ and $y_n+1$ of the input picture. These pixels belong to the columns of pixels numbered $x_m-1$, $x_m$, $x_m+1$ and $x_m+2$ of the input picture. The pixels of the input picture are represented on the figure by black dots. The distance is calculated at a point P situated inside the zone delimited by the coordinates $(x_m,y_n)$, $(x_m+1,y_n)$, $(x_m+1,y_n+1)$ and $(x_m,y_n+1)$. The pixel P is identified by the coordinates (x',y') in the input picture. In this example, the point P is situated at the centre of the zone delimited by the pixels at coordinates $(x_m,y_n)$, $(x_m+1,y_n)$, $(x_m+1,y_n+1)$ and $(x_m,y_n+1)$. A horizontal gradient, noted as $I_x(x',y')$, and a vertical gradient, noted as $I_y(x',y')$, are calculated for the luminance video component (Y in the space of the colours [Y, Cb, Cr] or [Y, U, V]) at this point P.

$$I_x(x', y') = \frac{\partial I}{\partial x}(x', y') =$$
$$I(x_m + 2, y_n) + I(x_m + 2, y_n + 1) - I(x_m - 1, y_n) - I(x_m - 1, y_n + 1)$$
$$I_y(x', y') = \frac{\partial I}{\partial y}(x', y') = I(x_m, y_n + 1) +$$
$$I(x_m + 1, y_n + 1) - I(x_m, y_n) - I(x_m + 1, y_n)$$

where I(x,y) designates the luminance component of the pixel at coordinates (x,y).

The distance d to point P is then taken to equal:

$$d = \frac{I_y(x', y')}{I_x(x', y')}$$

The distance d calculated for the pixel P is shown in FIG. 2. A line segment S links the point at coordinates $(x'+d,y_n)$ and the point at coordinates $(x'-d,y_n+1)$.

According to the invention, this distance d calculated at the point P is used to determine the value of all the pixels of the output picture belonging to the zone of the output picture corresponding to the zone delimited by the points at coordinates $(x_m,y_n)$, $(x_m+1,y_n)$, $(x_m+1,y_n+1)$ and $(x_m,y_n+1)$ in the input picture. It should be noted that the coordinates $(x_m,y_n)$, $(x_m+1,y_n)$, $(x_m+1,y_n+1)$, $(x_m,y_n+1)$ are the coordinates in the input picture. The output picture having a number of columns and a number of lines different to those of the input picture, the pixels delimiting this zone have different coordinates in the output picture. Naturally it is possible to extend this zone to any zone surrounding the point P having a different size and/or form.

Figure 3:
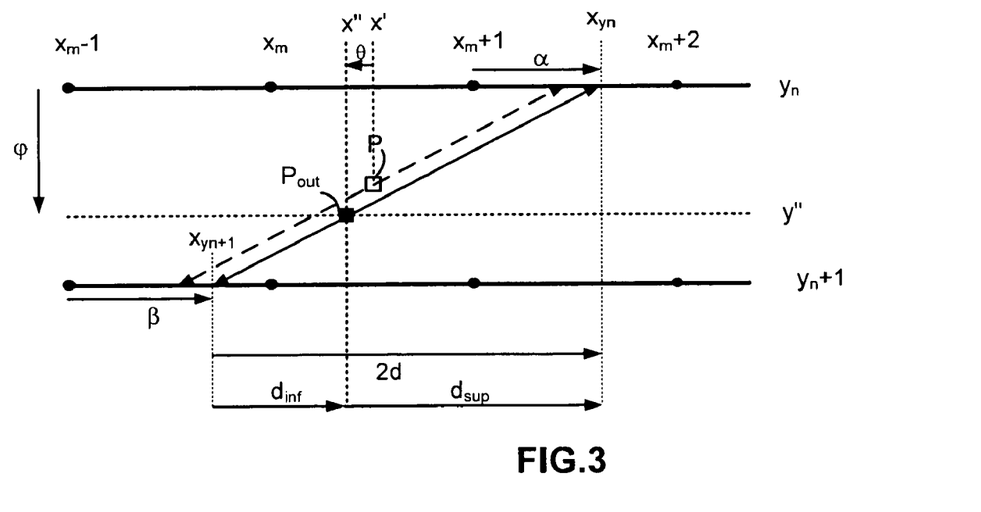
FIG. 3 shows the parameters used to calculate the value of a pixel $P_{out}$ of the output picture located in the same zone of the picture as the pixel P of the input picture shown in FIG. 2.

The format conversion modifies the number and position of lines and/or columns of pixels of the picture. For example, in the output picture, a line y" of pixels is present between the lines $y_n$ and $y_n+1$ of the input picture and a column of pixels x" is present between the columns of pixels $x_m$ and $x_m+1$ of the input picture. A pixel $P_{out}$ of the output picture is present at the intersection of the line y" and the column x" as shown in FIG. 3. The coordinates (x",y") are the coordinates of the pixel $P_{out}$ in the input picture. The output picture having a number of columns and/or lines different to those of the input picture, the pixel $P_{out}$ has different coordinates, noted as $(x_{out}, y_{out})$, in the output picture. The distance d calculated for the point P is used to determine the values of all the pixels $P_{out}$ present in the zone delimited by the points at coordinates $(x_m,y_n)$, $(x_m+1,y_n)$, $(x_m+1,y_n+1)$ and $(x_m,y_n+1)$.

With reference again to FIG. 1, the method also comprises a determination step 120, for at least one pixel of the output picture situated in this zone, of a second set of pixels in the input picture from the distance d previously calculated and from the position of this pixel of the output picture in this zone. For example, a second set of pixels of the input picture for the pixel $P_{out}$ is thus calculated. This step is described with reference to FIG. 3. To improve understanding of this step, the following notations are used.

v is the ratio of the number of lines of the input picture to the number of lines of the output picture, r is the ratio of the number of columns of the input picture to the number of columns of the output picture, For the pixel $P_{out}$ at coordinates $(x_{out},y_{out})$ in the in the output picture, the lines of pixels $y_n$ and $y_n+1$ of the input picture closest to the line $y_{out}$ are determined.

$$y''=v \cdot y_{out}$$

$$y_n=E(y'')$$

where E(x) designates the integer part of the variable x.

A vertical phase $\phi=|y''-y_n|$ representing the distance between the line y" of the pixel $P_{out}$ and the line $y_n$ of the input picture is defined. $\phi$ is comprised between 0 and 1.

The columns of pixels $x_m$ and $x_m+1$ of the input picture closest to the column $x_{out}$ are also determined.

$$X''=r \cdot x_{out}$$

$$x_m=E(x'')$$

A horizontal phase $\theta=x''-x_m-0.5$ representing the distance between the line x' of the pixel $P_{out}$ and the pixel P of the input picture is defined. $\theta$ is comprised between −0.5 and 0.5.

If the line segment S is translated horizontally so that it passes through the pixel $P_{out}$, this segment then links the point at coordinates $(x_{yn},y_n)$ and the point at coordinates $(x_{yn+1},y_n+1)$.

Then $x_{yn}=x''+2 \cdot \phi \cdot d+\theta=x''+d_{sup}$ and $x_{yn+1}=x''+2 \cdot (1-\phi) \cdot d+\theta=x''-d_{inf}$ are obtained.

It should be noted that $|d_{inf}+d_{sup}|=2d$.

The second set of pixels determined at step 120 is then for example:

the pixel at coordinates $(E(x_{yn}),y_n)$,
the pixel at coordinates $(E(x_{yn})+\text{sign}(d),y_n)$,
the pixel at coordinates $(E(x_{yn+1}),y_n+1)$,
the pixel at coordinates $(E(x_{yn+1})-\text{sign}(d),y_n+1)$,
where sgn(x) is the sign function of x $$sgn(x) = \begin{cases} -1 & \text{if } x < 0 \\ 0 & \text{if } x = 0 \\ 1 & \text{if } x > 0 \end{cases}$$

In the example of FIG. 3, the pixel at coordinates ($E(x_{yn})$, $y_n$) is the pixel at coordinates ($x_m+1, y_n$), the pixel at coordinates ($E(x_{yn})+\text{sign}(d), y_n$) is the pixel at coordinates ($x_m+2, y_n$), the pixel at coordinates ($E(x_{yn+1}), y_n+1$) is the pixel at coordinates ($x_m-1, y_n+1$) and the pixel at coordinates ($E(x_{yn+1})-\text{sign}(d), y_n+1$) is the pixel at coordinates ($x_m-1, y_n+1$).

With reference again to FIG. 1, the next step is step 130 that consists in calculating the value of the output pixel $P_{out}$ at coordinates $x_{out}$ and $y_{out}$ in the output picture from the value of the pixels of the set determined in step 120. For this calculation step, the parameters α and β are defined as follows:

$\alpha = |E(x_{yn}) - x_{yn}|$ $\beta = |E(x_{yn+1}) - x_{yn+1}|$

The value of the pixel P at coordinates ($x_{out}$, $y_{out}$) in the output picture is then calculated using the following formula that corresponds to a bilinear interpolation:

$I_{out}(x_{out}, y_{out}) = (1-\phi) \cdot [(1-\alpha) \cdot I_{in}(E(x_{yn}), y_n) + \alpha \cdot I_{in}(E(x_{yn}) + sgn(d), y_n)] + \phi[(1-\beta) \cdot I_{in}(E(x_{yn+1}), y_n+1) + \beta \cdot I_{in}(E(x_{yn+1}) + sgn(d), y_n+1)]$ where $-I_{in}(x,y)$ designates the value of the pixel at coordinates (x,y) in the input picture and $I_{out}(x,y)$ designates the value of the pixel at coordinates (x,y) in the output picture.

The calculation is carried out on each video component of the pixel. The distance d calculated for the luminance video component is used for the calculation of all the video components of the pixel from the output picture.

Other formulas for the calculation of the video components of pixels of the output picture can be considered. In the example above, the interpolation is bilinear. The use of a linear interpolation or an interpolation by selection of the closest neighbour or a combination of linear or bilinear interpolations can be envisaged. These interpolations are well known by those in the profession. Use of a greater number of lines or columns can also be envisaged. Finally changing the interpolation formula according to the distance module d can be provided for.

Figure 4:
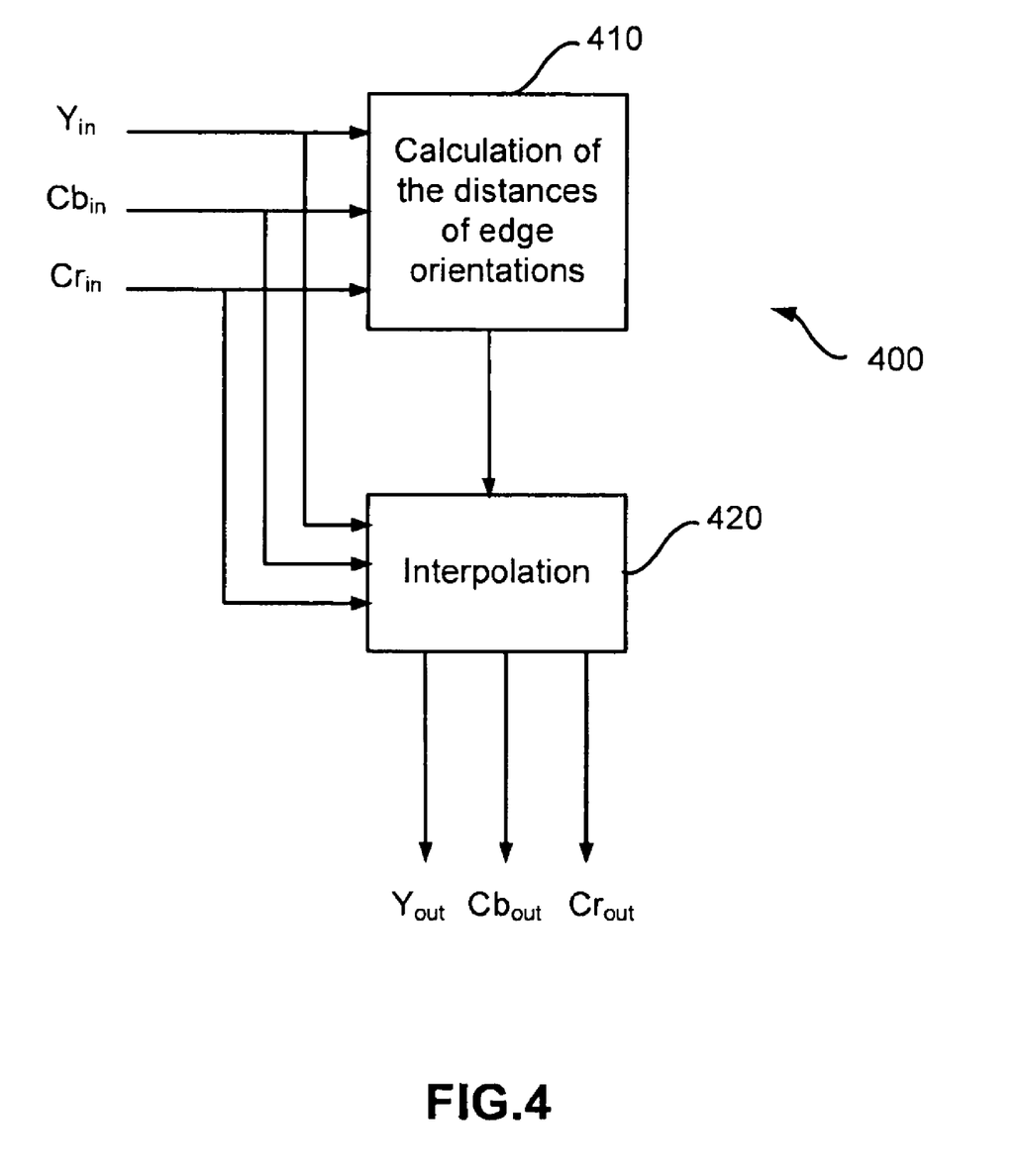
FIG. 4 shows a device capable of implementing the method of FIG. 1.

FIG. 4 illustrates a 400 device capable of implementing the method of the invention. $Y_{in}$, $Cb_{in}$ and $Cr_{in}$ designate the video components of the picture applied at the input of the device and $Y_{out}$, $Cb_{out}$ and $Cr_{out}$ designate the video components of the output picture of the device. These components are expressed in the colour space [Y, Cb, Cr]. Naturally other colour spaces can be used such as the colour spaces [Y, U, V] or [R, G, B]. For components expressed in the colour space [R, G, B], a luminance component Y is recalculated to determine the local gradients required for the distance calculation. The 400 device comprises:
- a calculation circuit 410 of distances representative of the edge orientations at points of the input picture, this circuit implements step 110 of the method of the invention, this circuit delivers a distances chart, and
- an interpolation circuit 430 implementing steps 120 and 130 of the method of the invention from the input picture and the distances chart delivered by the circuit 410, this filter delivers the output picture.

Figure 5:
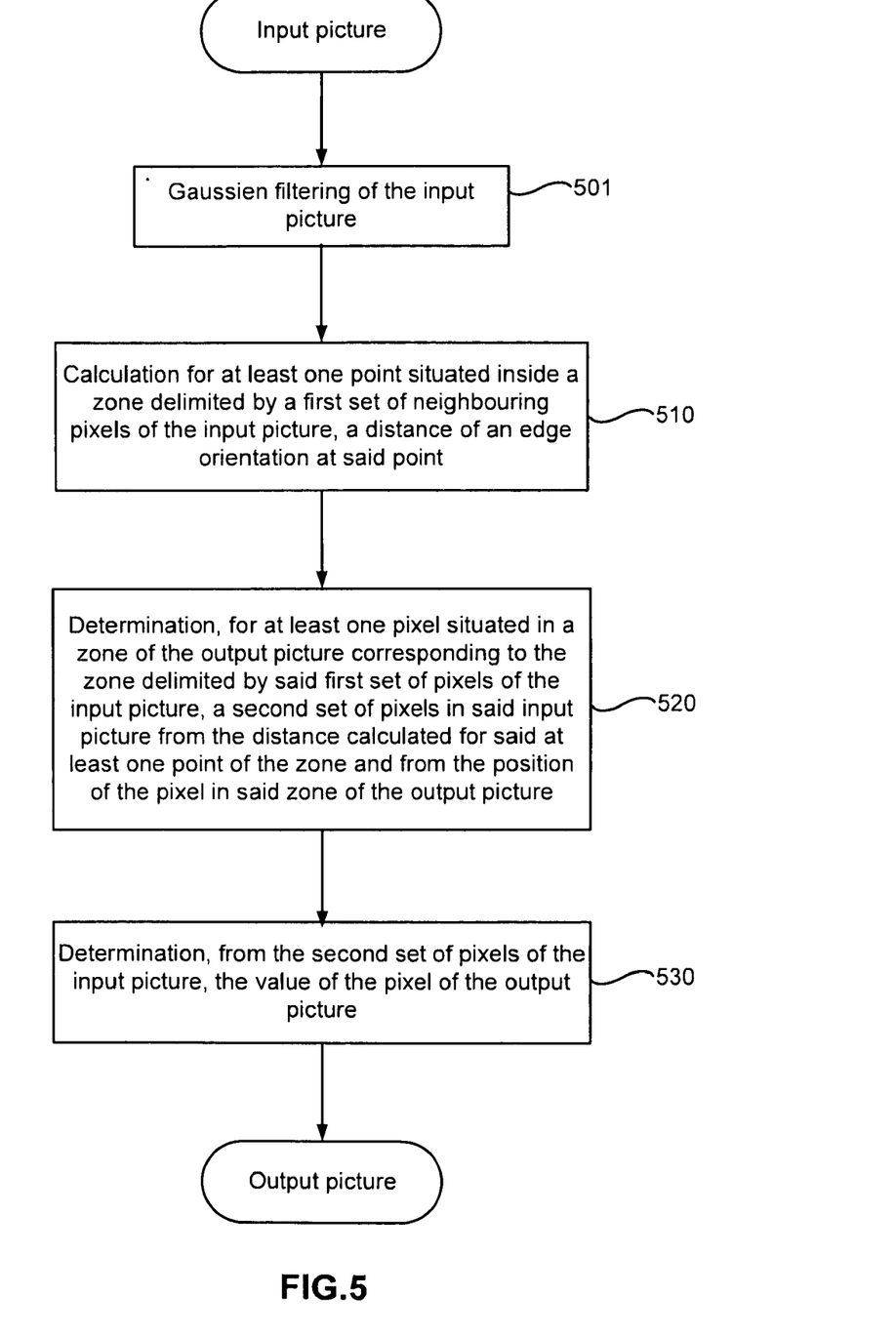
FIG. 5 shows the steps in a second embodiment of the method according to the invention.

FIG. 5 illustrates a second embodiment of the invention. This second embodiment comprises the steps 501, 510 520 and 530. The steps 510 to 530 are identical to steps 110 to 130 of the first embodiment illustrated by FIG. 1. This second embodiment comprises an additional step with the reference 501, of filtering of the input picture. The purpose of this filtering is to improve the calculation of the distances of the edge orientations of the input picture. The filter used is based on a Gaussian kernel. This filter is applied to the input picture signal luminance component Y. Hereafter, $I_{jf}$ designates the component $I_j$ filtered. The filtered component is then:

$$I_f(x, y) = G(x, y, \sigma) * I(x, y) = \iint G(\mu, \nu, \sigma) \cdot I(x - \mu, y - \nu) d\mu d\nu$$

where:

$$G(x, y, \sigma) = \frac{1}{2\pi\sigma^2} \exp\left(-\frac{(x^2 + y^2)}{2\sigma^2}\right),$$

$\sigma^2$ is the variance of the Gaussien kernel.

The filter used is for example the following 5×5 coefficients filter:

$$\frac{1}{100} \times [1 \quad 2 \quad 4 \quad 2 \quad 1] \otimes \begin{bmatrix} 1 \\ 2 \\ 4 \\ 2 \\ 1 \end{bmatrix} = \frac{1}{100} \times \begin{bmatrix} 1 & 2 & 4 & 2 & 1 \\ 2 & 4 & 8 & 4 & 2 \\ 4 & 8 & 16 & 8 & 4 \\ 2 & 4 & 8 & 4 & 2 \\ 1 & 2 & 4 & 2 & 1 \end{bmatrix}$$

Figure 6:
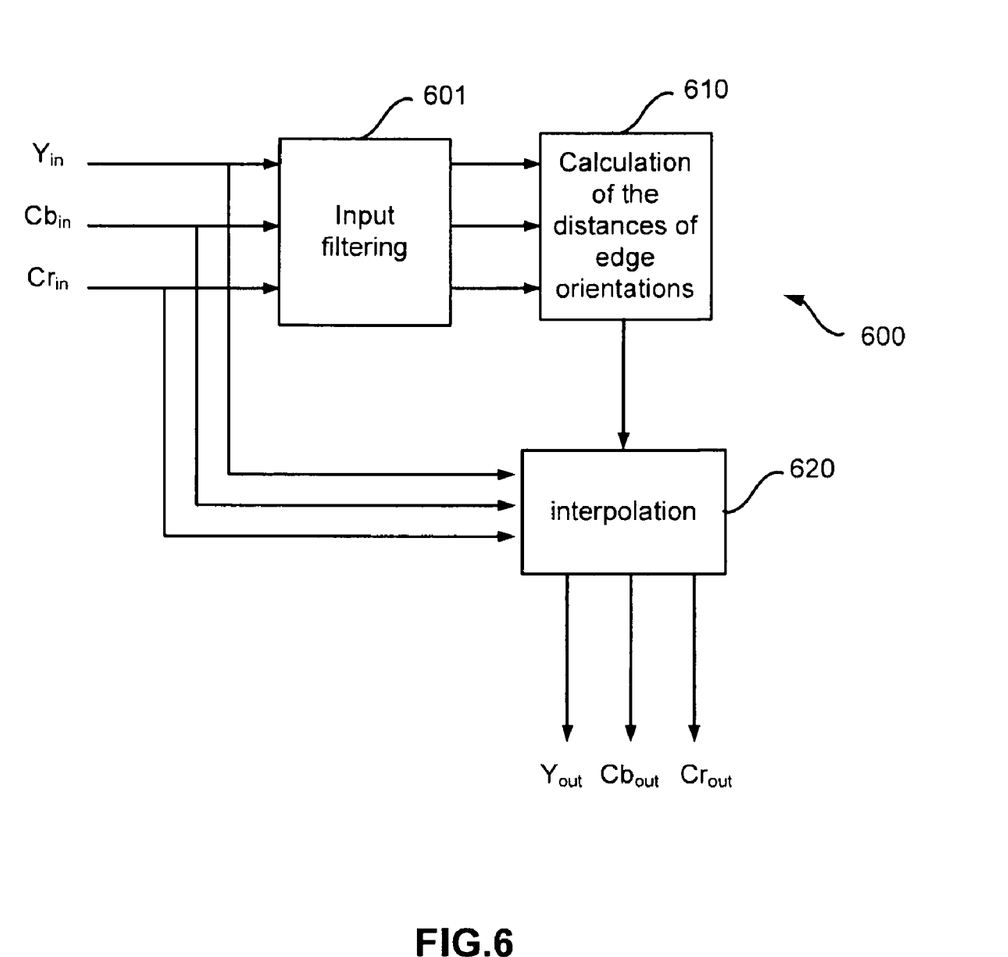
FIG. 6 shows a device capable of implementing the method of FIG. 5.

FIG. 6 illustrates a 600 device capable of implementing this second embodiment of the method of the invention. $Y_{in}$, $Cb_{in}$ and $Cr_{in}$ designate the video components of the picture applied at the input of the device and $Y_{out}$, $Cb_{out}$ and $Cr_{out}$ designate the video components of the output picture of the device. Naturally other colour spaces can be used such as the colour spaces [Y, U, V] or [R, G, B]. For components expressed in the colour space [R, G, B], a luminance component Y is recalculated to determine the local gradients required for the distance calculation. These components are expressed in the colour space [Y, Cb, Cr]. The 600 device comprises:
- a first filter 601 to implement the first filtering step 501, this filtering is applied to one or to all video components of the signal of the input picture,
- a calculation circuit 610 of distances representative of the edge orientations of the input picture, this circuit implements step 510 of the second embodiment of the method of the invention, this circuit delivers a distances chart, and
- an interpolation circuit 620 implementing steps 520 and 530 of the method of the invention from the input picture and the distances chart delivered by the filter 610, this circuit delivers the output picture.

In the method of the invention previously defined, the distance calculated at step 110 or 510 is used as is to determine the pixels of the second set. As a variant, if the distance calculated exceeds a predefined maximum value, this distance is capped at this maximum value. This maximum value is for example equal to 4 pixels for an SD (Standard Definition) picture. In fact, beyond this maximum value, the value of the distance d cannot be low thus introducing errors into the interpolation. According to another variant, if the distance calculated exceeds this maximum value, the distance is adjusted to a null value. This second variant enables even further reduction of the risk of errors while being however less precise in the interpolation of some edges.

Naturally, the invention is not limited to the aforementioned embodiments. Any format conversion method or device in which distances representative of the edge orientations are calculated at points of the input picture independently of the grid of the output picture, each point being associated with a zone of the picture, and in which the values of pixels in a zone of the output picture are calculated from the distance calculated for this zone and from the position of these output pixels with respect to the point of the input picture falls into the field of the present invention.

The invention claimed is:

1. A method for converting a format of an input picture to an output picture, said method comprising steps of:
    calculating, for one single point situated inside a zone delimited by a first set of neighboring pixels of said input picture, a single distance representative of an edge orientation at said point;
    determining, for each pixel of a plurality of pixels situated in a zone of the output picture corresponding to the zone of said input picture, a second set of pixels in said input picture from the single distance and from a position of said pixel of the output picture; and
    determining a value of said pixel of the output picture from values of pixels of said second set of pixels.

2. The method according to claim 1, wherein said first set of neighboring pixels belong to at least two consecutive lines or columns of pixels of the input picture.

3. The method according to claim 1, wherein said point is situated at a centre of said zone.

4. The method according to claim 2, wherein the calculated distance depends on a local gradient of a luminance video component of the input picture at said point.

5. The method according to claim 2, wherein, if said calculated distance exceeds a maximum value, said calculated distance is capped at said maximum value.

6. The method according to claim 2, wherein, if said calculated distance exceeds a maximum value, said calculated distance is adjusted to a null value.

7. The method according to claim 2, wherein the value of said pixel of the output picture is determined by bilinear interpolation of the pixels of said second set of pixels.

8. A device for converting a format of an input picture to an output picture, said device comprising:
    a calculation circuit operative to calculate, for one single point situated inside a zone delimited by a first set of neighboring pixels of said input picture, a single distance representative of an edge orientation at said point; and
    an interpolation circuit operative to determine, for each pixel of a plurality of pixels situated in a zone of the output picture corresponding to the zone of said input picture, a second set of pixels in said input picture from the single distance and from a position of said pixel of the output picture, and to determine a value of said pixel of said output picture from values of pixels of said second set of pixels.

* * * * *